(12) United States Patent
Chen et al.

(10) Patent No.: US 12,423,045 B2
(45) Date of Patent: Sep. 23, 2025

(54) ELECTRONIC DEVICE

(71) Applicant: Lenovo (Beijing) Limited, Beijing (CN)

(72) Inventors: Jianyang Chen, Beijing (CN); Huiqiang He, Beijing (CN); Shuang Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/490,877

(22) Filed: Oct. 20, 2023

(65) Prior Publication Data

US 2024/0176572 A1    May 30, 2024

(30) Foreign Application Priority Data

Nov. 30, 2022 (CN) .......................... 202211529627.7

(51) Int. Cl.
| | |
|---|---|
| *G06F 3/14* | (2006.01) |
| *F16M 13/02* | (2006.01) |
| *G06F 3/03* | (2006.01) |
| *G09G 3/20* | (2006.01) |
| *G09G 3/3208* | (2016.01) |

(52) U.S. Cl.
CPC .......... *G06F 3/1446* (2013.01); *F16M 13/022* (2013.01); *G06F 3/03* (2013.01); *G09G 3/2096* (2013.01); *G09G 3/3208* (2013.01); *G09G 2300/026* (2013.01); *G09G 2354/00* (2013.01)

(58) Field of Classification Search
CPC ....... G06F 3/1446; G06F 3/03; F16M 13/022; G09G 3/2096; G09G 3/3208; G09G 2300/026; G09G 2354/00
See application file for complete search history.

(56) References Cited

U.S. PATENT DOCUMENTS

| | | | |
|---|---|---|---|
| 2005/0052835 A1* | 3/2005 | Wu ....................... | G06F 1/1647 361/679.04 |
| 2006/0082518 A1* | 4/2006 | Ram ..................... | G06F 1/1675 345/1.1 |
| 2008/0024388 A1* | 1/2008 | Bruce ................... | G06F 1/1616 345/1.1 |
| 2012/0256929 A1* | 10/2012 | Koenig .................... | G09G 5/00 345/503 |
| 2021/0080999 A1* | 3/2021 | Bryant .................. | G06F 1/1641 |

* cited by examiner

*Primary Examiner* — Antonio Xavier
(74) *Attorney, Agent, or Firm* — ANOVA LAW GROUP, PLLC

(57) ABSTRACT

Electronic device is provided. The electronic device includes a host system; at least two input/output modules configured to realize input and/or output functions of the electronic device; a connection device, for connecting the host system and the at least two input/output modules to enable the at least two input/output modules to perform a same type and/or different types of motion relative to the host system, so that the electronic device has different device forms; and the at least two input/output modules having a same posture or different postures relative to the host system when the electronic device is in different device forms.

16 Claims, 10 Drawing Sheets

ELECTRONIC DEVICE

CROSS-REFERENCE TO RELATED APPLICATION

This application claims priority of Chinese Patent Application No. 202211529627.7, filed on Nov. 30, 2022, the entire contents of which are hereby incorporated by reference.

FIELD OF THE DISCLOSURE

The present disclosure generally relates to the field of electronic device technology and, more particularly, relates to an electronic device.

BACKGROUND

With the development of electronic information technology, users have higher and higher requirements for electronic devices. An electronic device in the related art transmits information to an input/output module through a host system to realize input and/or output of the electronic device.

However, there is only one input/output module in the electronic device in the related art, which cannot be used by a group of users at a same time. Moreover, the input/output module is separated from the host system and cannot be adjusted according to a user's usage habits. The electronic device is not easy to carry, resulting in a single form.

BRIEF SUMMARY OF THE DISCLOSURE

One aspect of the present disclosure provides an electronic device. The electronic device includes a host system; at least two input/output modules configured to realize input and/or output functions of the electronic device; a connection device, for connecting the host system and the at least two input/output modules to enable the at least two input/output modules to perform a same type and/or different types of motion relative to the host system, so that the electronic device has different device forms; and the at least two input/output modules having a same posture or different postures relative to the host system when the electronic device is in different device forms.

Other aspects of the present disclosure can be understood by a person skilled in the art in light of the description, the claims, and the drawings of the present disclosure.

Figure 1:
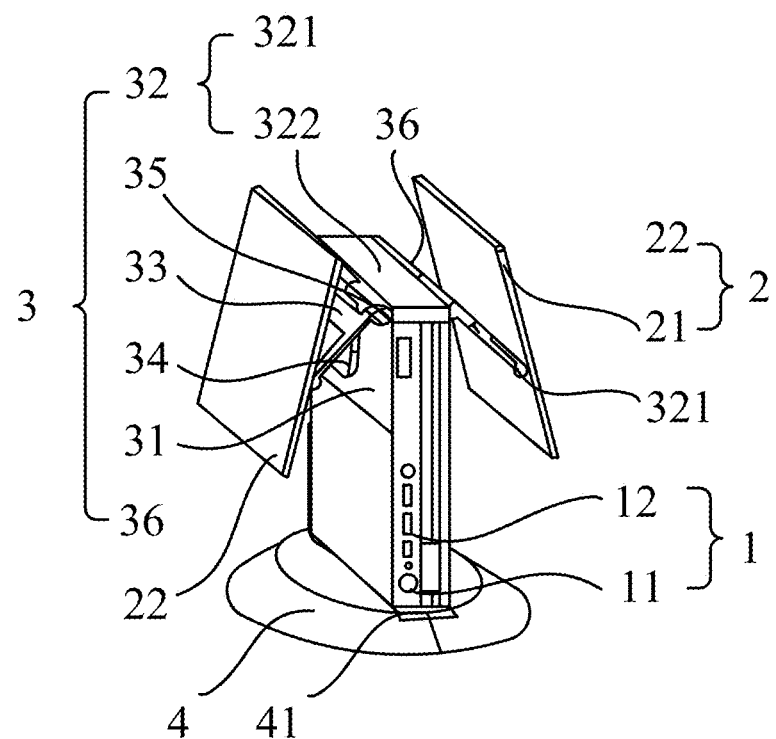
FIG. 1 illustrates a schematic diagram of two input/output modules on two sides of a host system and tilted relative to the host system in an electronic device consistent with various embodiments of the present disclosure.

Reference sign list: 1—host system; 11—switch key; 12—plug-in interface; 2—input/output module; 21—first input/output module; 22—second input/output module; 3—connection device; 31—assembly structure; 32—first connection assembly; 321—first connection component; 3211—first base; 3212—first connection portion; 3213—fourth rotating shaft structure; 322—second connection component; 3221—locking component; 33—second connection assembly; 331—second base; 332—second connection portion; 333—fifth rotating shaft structure; 34—third connection assembly; 341—third rotating shaft structure; 35—first rotating shaft structure; 351—first locking portion, 3511—first groove; 36—second rotating shaft structure; 361—second locking portion; 3611—second groove; 4—substrate; 41—accommodation space; 42—I/O interface.

DETAILED DESCRIPTION

It should be noted that, without conflict, embodiments and technical features in the embodiments can be combined with each other. Detailed descriptions in specific embodiments should be understood as an explanation of the gist of the present disclosure and should not be regarded as undue limitation of the present disclosure.

To make the purpose, technical solutions, and advantages of the embodiments of the present disclosure clearer, specific technical solutions of the present disclosure will be further described in detail below in conjunction with accompanying drawings in the embodiments of the present disclosure. The following examples are used to illustrate the present disclosure but are not intended to limit the scope of the present disclosure.

In the embodiments of the present disclosure, terms "first" and "second" are only used for descriptive purposes and cannot be understood as indicating or implying relative importance or implicitly specifying the quantity of indicated technical features. Therefore, a feature defined as "first" or "second" may explicitly or implicitly include one or more of the features. In the description of the present disclosure, "a plurality" means two or more, unless specifically limited otherwise.

In addition, in the present disclosure, directional terms such as "upper", "lower", "left" and "right" are defined with respect to the orientation in which components are schematically positioned in the accompanying drawings. It should be understood that the orientation terms are relative concepts and are used for relative description and clarification and may change correspondingly according to a change in a position in which a component is placed in the accompanying drawings.

In the embodiments of the present disclosure, unless otherwise explicitly specified and limited, the term "connection" should be understood in a broad sense. For example, the "connection" may be a fixed connection, a detachable connection, or an integral connection; and may be a direct connection or an indirect connection using an intermediate medium.

In the embodiments of the present disclosure, terms "include", "comprise" or any other variations thereof are intended to cover a non-exclusive inclusion such that a process, method, article, or apparatus that includes a list of elements includes not only those elements, but also others not expressly listed elements, or elements inherent to such process, method, article, or apparatus. Without further limitation, an element defined by the statement "comprises a . . . " does not exclude the presence of additional identical elements in a process, method, article or apparatus that includes that element.

In the embodiments of the present disclosure, words such as "exemplary" or "for example" are used to mean an example, illustration or description. Any embodiment or design described herein as "exemplary" or "for example" is not to be construed as preferred or advantageous over other embodiments or designs. Rather, a use of words such as "exemplary" or "for example" is intended to present related concepts in a concrete manner.

An electronic device is provided in one embodiment. The electronic device can be a desktop computer, a camera, a speaker device, or other type of product. It should be noted that a type of the electronic device is no limited herein. The electronic device selected in the embodiment is a desktop computer.

Figure 2:
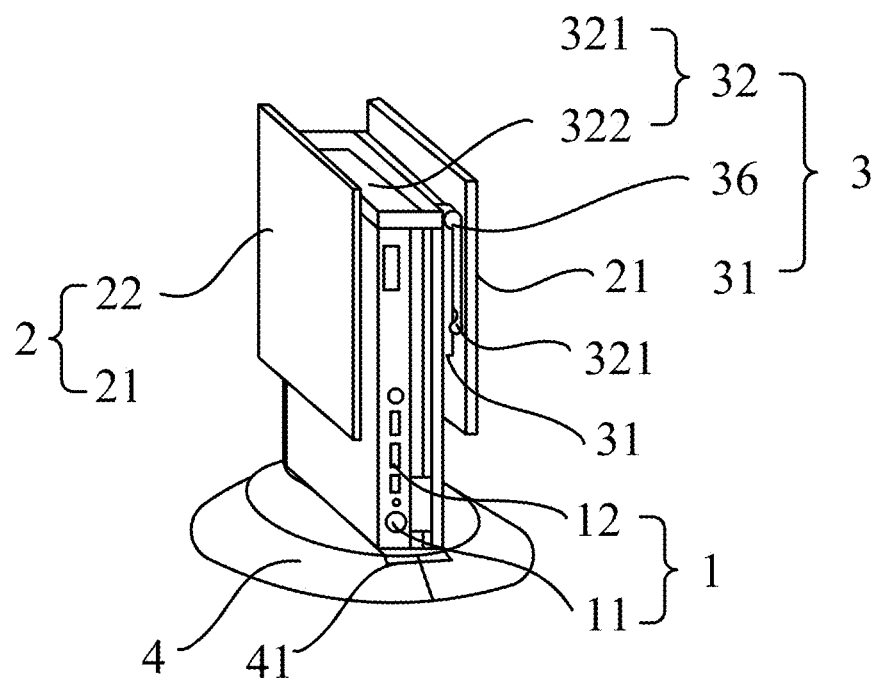
FIG. 2 illustrates a schematic diagram of two input/output modules on two sides of a host system and parallel to the host system in an electronic device consistent with various embodiments of the present disclosure.
Figure 3:
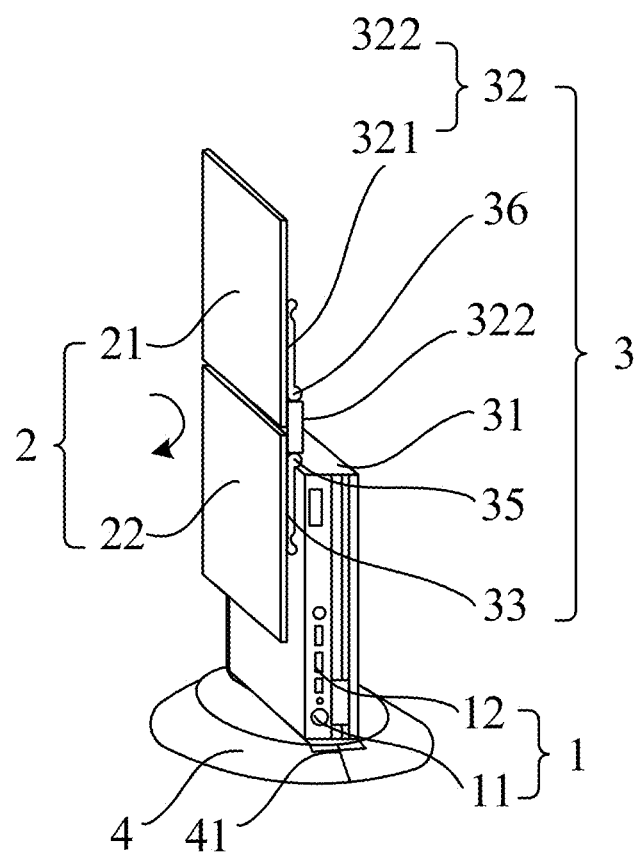
FIG. 3 illustrates a schematic diagram of two input/output modules being spliced in an electronic device consistent with various embodiments of the present disclosure.

Specifically, referring to FIGS. 1-3, in one embodiment, an electronic device includes a host system 1, at least two input/output modules 2 and a connection device 3. The at least two input/output modules 2 can realize input and/or output functions of the electronic device. The connection device 3 is configured to connect the host system 1 and the at least two input/output modules 2 to realize a same type and/or different types of motion of the at least two input/output modules 2 relative to the host system 1, so that the electronic device has different device forms. When the electronic device is in different device forms, the at least two input/output modules 2 have a same posture or different postures relative to the host system 1.

Referring to FIGS. 4-7, since the electronic device includes at least two input/output modules 2 which can realize input and/or output functions of the electronic device, a group of users can use the electronic device at a same time. The electronic device also includes a connection device 3 configured to connect the host system 1 and the at least two input/output modules 2 to enable the at least two input/output modules 2 to perform a same type and/or different types of motion relative to the host system 1. Therefore, postures of the at least two input/output modules 2 can be adjusted according to a user's usage habits and needs, to facilitate the user's use and portability. The at least two input/output modules 2 have a same or different positions relative to the host system 1, so that forms of the electronic device are diverse and a user's interest in using the electronic device is enhanced. In addition, in the embodiment, the electronic device can be used by a group of users at a same time, and positions and postures of the input/output modules can be adjusted according to a user's different usage habits, making the electronic device easy to carry and making forms of electronic equipment diversified.

Figure 8:
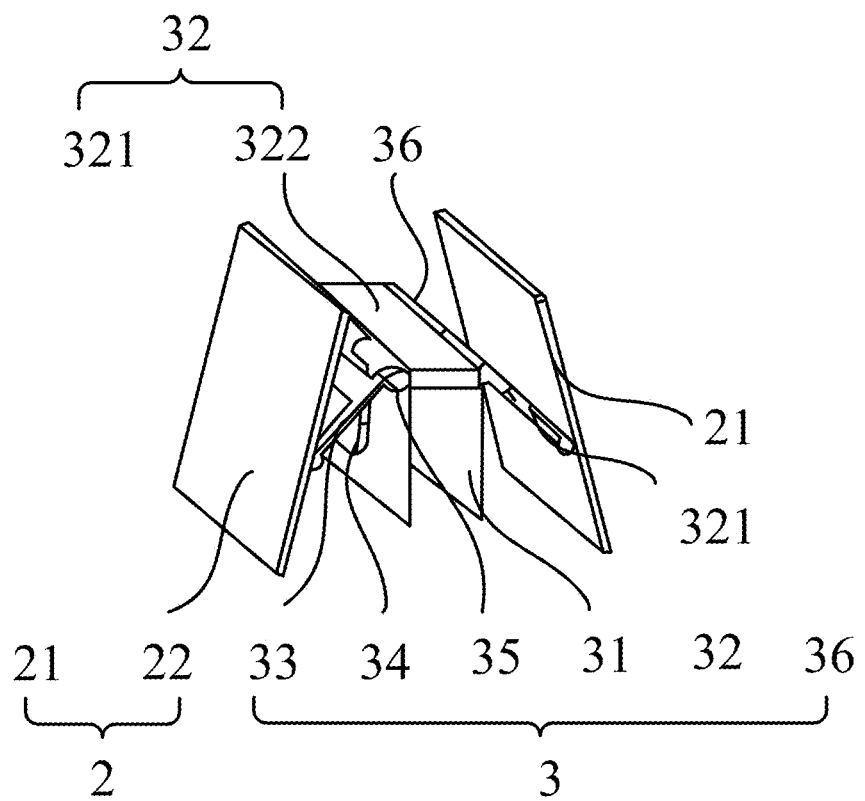
FIG. 8 illustrates a schematic diagram of two input/output modules connected to a connection device in FIG. 1 consistent with various embodiments of the present disclosure.
Figure 9:
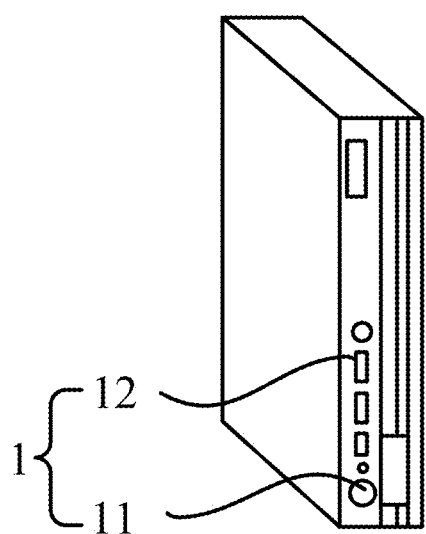
FIG. 9 illustrates a schematic diagram of a host system of an electronic device consistent with various embodiments of the present disclosure.

Referring to FIG. 8 and FIG. 9, the host system 1 can be a desktop computer chassis, a camera processing device, a microphone processing device, or other type of electronic device, which is not limited herein. The host system 1 also includes a switch key 11, which can control opening and closing of the electronic device. The host system 1 also includes a plurality of plug-in interfaces 12 to ensure a normal functioning of the electronic device and/or to facilitate external plug-ins by users.

An input/output module 2 can only realize input and/or output functions of the electronic device. That is, the input/ output module 2 can only realize the input function or the output function or can realize both the input and output functions of the electronic device, which is not limited herein. The input/output module 2 can realize the input and/or output functions of the electronic device. The input/output module 2 can be a display module to display information of the electronic device, a camera to capture external information; a microphone to obtain a user's voices; a speaker, an electronic whiteboard, a touch pad, a pressure writing pad, a projection module, or the like, which is not limited herein. In one embodiment, the input/output module 2 is a display module.

The electronic device includes at least two input/output modules 2, which can realize the input and/or output functions of the electronic device to facilitate a user's multi-angle use. The electronic device may include two, three or four input/output modules 2, which is not limited herein.

In one embodiment, the electronic device includes two input/output modules 2, also referred to as a dual screen display module capable of splitting a screen. Referring to FIG. 1 and FIG. 2, for example, users on two sides can directly view A and B display modules face to face at a same time, in many face-to-face (F2F) interaction scenarios, such as checking out at a bank counter in a shopping mall or supermarket, ordering food at a front desk of a restaurant, seeking consultation at a front desk of a hospital, or the like. Display module A is for staff, display module B is for customers, and display modules A and B simultaneously display ongoing business content to improve communication accuracy and business operation efficiency. Referring to FIGS. 3-7, The dual screen display module can also be spliced to expand different usage scenarios, such as multi-document editing, situations that require long progress scrolling, and library retrieval of information. One display module displays a query interface, and the other display module displays query results and the like.

Preferably, in one embodiment, the display module can adopt an organic light-emitting diode (OLED) plane, which has a self-luminous technology and does not need a backlight. When a current passes through the display module with a very thin organic material coating and a glass substrate, the organic material emits light, so that the OLED display module can be lighter and thinner, have a wider viewing angle, and significantly reduce power consumption, thereby ensure a portability of the electronic device. In one embodiment, when the OLED display module is combined with an outer casing, a total thickness can be in a range of 3 to 4 mm.

Referring to FIGS. 1, 2, 3 and 7, the connection device 3 is further configured to connect the host system 1 and at least two input/output modules 2 and is configured to enable the at least two input/output modules 2 to perform a same type and/or different types of motion relative to the host system 1, so that the electronic device has different device forms. The motions can be turning, rotational, lifting, or other type of motions relative to the host system 1, which are not limited herein. In addition, the motions may include only one type, such as a horizontal or rotational motion, or the motions may be a combination of different types, such as both horizontal and rotational motions, which are also not limited herein. The motions are all motions performed by the connection device 3.

At least two input/output modules 2 perform a same type and/or different types of motion relative to the host system 1 so that the electronic device has different device forms. The at least two input/output modules 2 can perform a same type of motion or different types of motion relative to the host system 1, or the at least two input/output modules 2 can partially perform a same type of motion and partially perform different types of motion relative to the host system 1, which is not limited herein.

Furthermore, the connection device 3 is configured to connect the host system 1 and at least two input/output modules 2. The connection can be detachable or non-detachable fixed, which is not limited herein. Compared to non-detachable fixing, the embodiment uses detachable fixing for easier maintenance and use.

In some embodiments, the electronic device also includes a substrate 4 for placing the host system 1 on a bearing surface. The substrate 4, the host system 1, the connecting device 3 and the at least two input/output modules 2 are integrated to ensure an overall stability of the electronic device under various movements and to facilitate portability.

Figure 10:
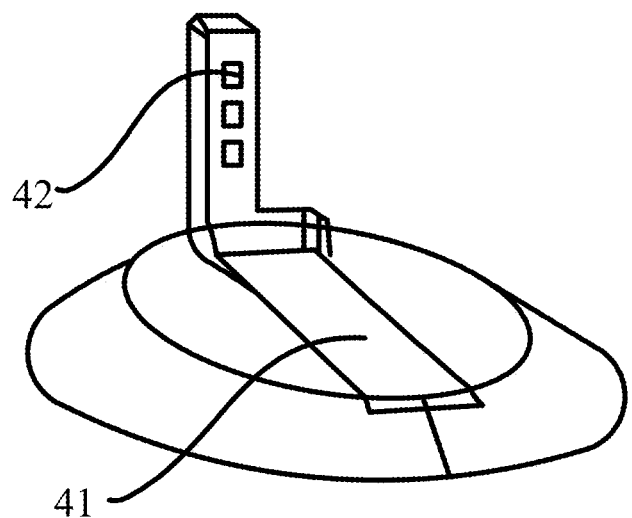
FIG. 10 illustrates a schematic diagram of a base of an electronic device consistent with various embodiments of the present disclosure.

Specifically, referring to FIGS. 8, 9 and 10, the substrate 4 is arranged with an accommodation space 41 and/or I/O interfaces 42 that match the host system 1. The accommodation space 41 is arranged on the substrate 4 so that the host system 1 can be restricted within the accommodating space 41 to prevent a shaking possibility of the host system 1 when the at least two input/output modules 2 perform a same type and/or different types of motion relative to the host system 1. The substrate 4 is also arranged with the I/O interfaces 42, which are links between the host system 1 and the at least two input/output modules 2 for information exchange. The interfaces include external interfaces, such as front interfaces, and internal interfaces, such as rear interfaces. Therefore, plug-in interfaces 12 on the host system 1 are connected directly to the I/O interfaces 42 arranged on the substrate 4 through standard interface signals such as USB Type-C or Type-C signals, thereby eliminating a need to open holes outside the host system 1 for wiring, and ensuring a integrity of the host system 1, and allowing the host system 1 also to be used in the input/output module 2 in the related art. In addition, in a multi-user network conferencing mode, the electronic device can work normally with the substrate 4, and users can directly receive information from each other.

In addition, the type of the I/O interfaces 42 can be one type or a plurality of types. To facilitate the plugging of the plurality of types of interfaces, the plurality of types of I/O interfaces 42 can be arranged on the substrate 4. In one embodiment, three types of I/O interfaces 42 are arranged on the substrate 4.

The substrate 4 may also include input or output components, such as speakers, microphones, or the like. In addition, a connection between the substrate 4 and the at least two input/output modules 2 can be either a wireless connection or a wired connection, which is not limited herein. In one embodiment, the substrate 4 is connected to the at least two input/output modules 2 via a wireless connection, which facilitates a portability of the electronic device.

The electronic device may also include a driving structure, which may be driven by various means, including but not limited to a motor, a cylinder, or other type of driving.

Specifically, the driving structure is connected to the connection device 3 and can generate driving forces to drive the input/output modules 2 to perform a same type and/or different types of motion relative to the host system 1. The motions can be turning, rotational, lifting, or other types of motion relative to the host system 1, which are not limited herein. In addition, the motions may include only one type, such as horizontal or rotational motion, or a combination of different types, including both horizontal and rotational motions, which is also not limited herein.

Further, the electronic device also includes a controller, signally connected to the driving structure and configured to control the driving structure to generate driving forces according to obtained control instructions to drive the input/output modules 2 to perform a same type and/or different types of motion relative to the host system 1. The obtained control instructions can be automatically generated internally by the electronic device or can be received from outside, which are not limited herein.

Furthermore, the electronic device also includes detection components, which can detect environmental information in which the electronic device is located. Environmental information can include users, usage scenarios, environmental parameters, change information, or similar data, such as changes in number of users, changes in user identities, changes in user preferences, and so on. The electronic device can generate control instructions based on environmental information or environmental change information based on the environment. The detection components may be included in the input/output module 2, such as various sensors embedded in the input/output module 2. The detection components may operate independently without the input/output module 2. For example, the detection components can be cameras capable of capturing environmental information from the electronic device. The electronic device can produce control instructions based on environmental information or environmental change information and control the driving structure to generate driving forces to drive the input/output module 2 to perform a same type and/or different types of motion relative to the host system 1.

In some other embodiments, referring to FIGS. 11-14, the connection device 3 includes an assembly structure 31, a first connection assembly 32 and a second connection assembly 33. The assembly structure 31 is configured to fix the connection device 3 onto the host system 1. The first connection assembly 32 is movably connected to the assembly structure 31 and a first input/output module 21 of the at least two input/output modules 2. The first connection assembly 32 can perform a first type of motion relative to the assembly structure 31, so that the first input/output module 21 has different postures relative to the host system 1. The second connection assembly 33 is movably connected to the assembly structure 31 and a second input/output module 22 of at least two input/output modules 2. The second connection assembly 33 can perform the first type of motion relative to the assembly structure 31, so that the second input/output module 22 has different postures relative to the host system 1. When the first connection assembly 32 has a first posture relative to the assembly structure 31, the first connection assembly 32 and the second connection assembly 33 can perform a second type of motion relative to the assembly structure 31, so that the first input/output module 21 and the second input/output module 22 have different postures relative to the host system 1.

The assembly structure 31 is configured to fix the connection device 3 onto the host system 1. The assembly structure 31 can be a U-shaped card holder that clamps onto the host system 1, thereby fixing the connection device 3 onto the host system 1 and avoiding shaking of the first connection assembly 32 and the second connection assembly 33 when the first connection assembly 32 and the second connection assembly 33 perform the first type and/or the second type of motion relative to the assembly structure 31. In addition, the assembly structure 31 is designed as a U-shaped card holder and is snap-connected to the host system 1 without affecting appearance and structural form of the host system 1. The assembly structure 31 can also be a hook, which is configured to adapt to a slot on the host system 1 to fix the connection device 3 onto the host system 1. The assembly structure 31 can also be other structure, which is not limited herein.

The first connection assembly 32 is movably connected to the assembly structure 31 and the first input/output module 21 of the at least two input/output modules 2, and the first connection assembly 32 can perform the first type of motion relative to the assembly structure 31 so that the first input/output module 21 has different postures relative to the host system 1. Referring to FIG. 1 and FIG. 2, the first type of motion can be in a split-screen state, so that the first input/output module is on a side of the host system 1 and is tilted or parallel to the host system 1. Or the first type of motion can also be an up-and-down motion relative to the host system 1, that is, a flipping motion of the first connection assembly 32. The first connection assembly 32 is movably connected to the assembly structure 31. The movable connection may be a hinge connection, a rotating shaft connection, or other connection, which is not limited herein. In one embodiment, the first connection assembly 32 and the assembly structure 31 are movably connected through a rotating shaft structure, so that the first connection assembly 32 can quickly and accurately perform the first type of motion relative to the assembly structure 31.

The first connection assembly 32 is movably connected to the first input/output module 21 of the at least two input/output modules 2. The movable connection can be a hinge connection, a rotating shaft connection, or other connection, which is not limited herein. In one embodiment, the first connection assembly 32 is connected to the first input/output module 21 through a rotating shaft structure.

Similarly, the second connection assembly 33 is movably connected to the assembly structure 31 and the second input/output module 22 of the at least two input/output modules 2. The second connection assembly 33 can perform the first type of motion relative to the assembly structure 31, so that the second input/output module 22 has different postures relative to the host system 1. Referring to FIG. 1 and FIG. 2, the first type of motion can be in a split-screen state, so that the second input/output module 22 is on a side of the host system 1 and is tilted or parallel to the host system 1. Or the first type of motion can also be an up-and-down motion relative to the host system 1, that is, a flipping motion of the second connection component 33.

The second connection assembly 33 is movably connected to the assembly structure 31. The movable connection may be a hinge connection, a rotating shaft connection, or other connection, which is not limited herein. In one embodiment, the second connection assembly 33 and the assembly structure 31 are movably connected through a rotating shaft structure, so that the second connection assembly 33 can quickly and accurately perform the first type of motion relative to the assembly structure 31.

The second connection assembly 33 is movably connected to the second input/output module 22 of the at least two input/output modules 2. The movable connection can be a hinge connection, a rotating shaft connection, or other connection, which is not limited herein. In one embodiment, the second connection assembly 33 is connected to the second input/output module 22 through a rotating shaft structure.

Figure 7:
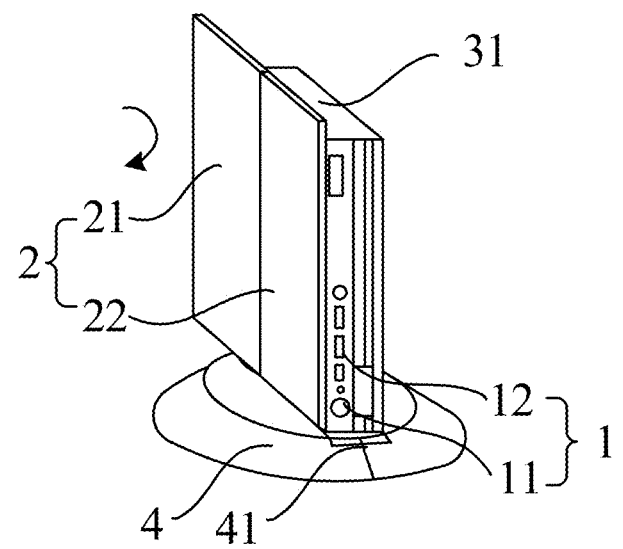
FIG. 7 illustrates another schematic diagram of two input/output modules being spliced in an electronic device consistent with various embodiments of the present disclosure.

When the first connection assembly 32 has a first orientation relative to the assembly structure 31, the first orientation is that the first connection assembly 32 and the second connection assembly 33 are on a same side of the assembly structure 31. In addition, referring to FIGS. 3, 7, 13 and 14, the first connection assembly 32 and the second connection assembly 33 can perform the second type of motion relative to the assembly structure 31, so that first input/output module 21 and the second input/output module 22 have different postures relative to the host system 1. Referring to FIGS. 3 and 7, the second type of motion is rotational motion when the first connection assembly 32 and the second connection assembly 33 are on a same side. The two input/output modules 2 are on a side of the host system 1 and are spliced vertically relative to the host system 1. Through the second type of motion, the two input/output modules 2 are spliced horizontally relative to the host system 1. The two input/output modules 2 can also be spliced in any direction between a vertical direction and a horizontal direction relative to the host system 1.

In some other embodiments, the connection device 3 also includes a third connection assembly 34 movably connected to the assembly structure 31. The third connection assembly 34 is connected to the first connection assembly 32 and the second connection assembly 33 through a first rotating shaft structure 35. The first connection assembly 32 and the second connection assembly 33 can perform the second type of motion relative to the assembly structure 31 through the third connection assembly 34 to facilitate a user's adjustment according to different usage habits, while increase a diversity of postures of the electronic device.

Figure 4:
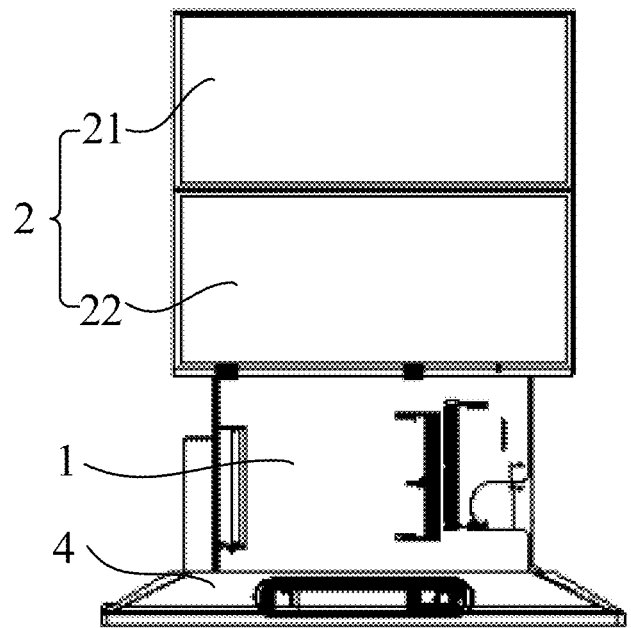
FIG. 4 illustrates another schematic diagram of two input/output modules being spliced in an electronic device consistent with various embodiments of the present disclosure.
Figure 5:
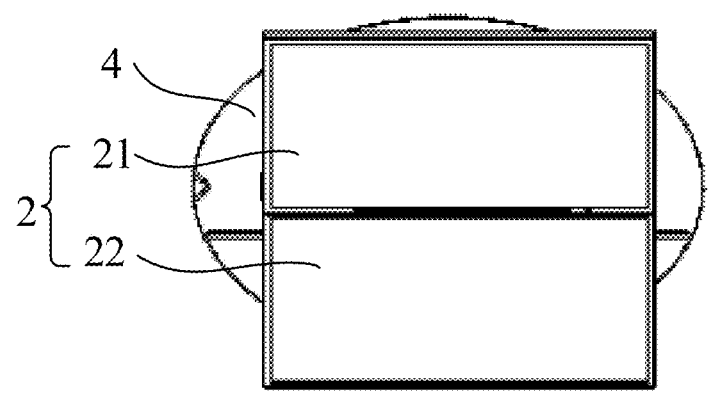
FIG. 5 illustrates another schematic diagram of two input/output modules being spliced in an electronic device consistent with various embodiments of the present disclosure.
Figure 6:
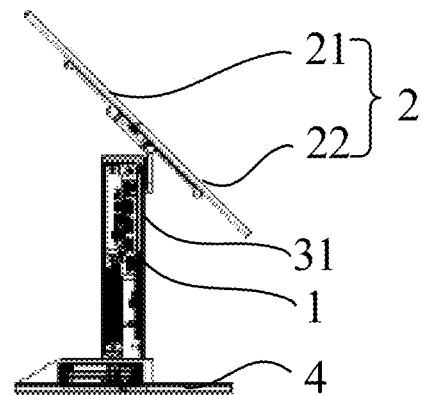
FIG. 6 illustrates another schematic diagram of two input/output modules being spliced in an electronic device consistent with various embodiments of the present disclosure.

Referring to FIGS. 4-6, the third connection assembly 34 is connected to the first connection assembly 32 and the second connection assembly 33 through the first rotating shaft structure 35. The first connection assembly 32 and the second connection assembly 33 can also adjust pitch angles of the two input/output modules 2 through the first rotating shaft structure 35. Specifically, if the first rotating shaft structure 35 rotates toward a side close to the second connection assembly 33, a pitch angle of the first input/output module 21 increases, while a pitch angle of the second input/output module 22 decreases. If the first rotating shaft structure 35 rotates toward a side away from the second connection assembly 33, the pitch angle of the first input/output module 21 decreases, while the pitch angle of the second input/output module 22 increases. In other embodiments, the two input/output modules can also be rotated synchronously through the first rotating shaft structure 35 to adjust the pitch angle of the two input/output modules 2 relative to the host system, so that a user has a dual-screen tilting experience.

The third connection assembly 34 is movably connected to the assembly structure 31. The movable connection can be a hinge connection, a rotating shaft connection, or other connection, which is not limited herein. In one embodiment, the third connection assembly 34 is movably connected to the assembly structure 31 through a rotating shaft structure.

The third connection assembly 34 is connected to the first connection assembly 32 and the second connection assembly 33 through the first rotating shaft structure 35, which can conveniently and quickly enable the first connection assembly 32 and the second connection assembly 33 to perform the second type of motion relative to the assembly structure 31 through the third connection assembly 34.

Specifically, a first rotation hole can be arranged on both the first connection assembly 32 and the second connection assembly 33, a first rotation axis can be arranged on the third connection assembly 34, and the first rotation shaft extends into the first rotation hole, or a first rotation shaft may also be arranged on the first connection assembly 32 and the second connection assembly 33, a first rotation hole may be arranged on the third connection assembly 34, and the first rotation shaft extends into the first rotation hole to realize that the third connection assembly 34 is connected to the first connection assembly 32 and the second connection assembly 33 through the first rotation shaft structure 35.

Referring to FIG. 3 and FIG. 7, the first connection assembly 32 and the second connection assembly 33 can perform the second type of motion relative to the assembly structure 31 through the third connection assembly 34, that is, a rotational motion of the first connection assembly 32 and the second connection assembly 33 relative to the assembly structure 31. Therefore, a third rotating shaft structure 341 is also arranged on the third connection assembly 34. A rotation axis of the third rotating shaft should be perpendicular to a surface of the input/output module 2. Specifically, a third rotation axis can be arranged on the assembly structure 31, a third rotation hole can be arranged on the third connection assembly 34, and the third rotation axis extends into the third rotation hole, or a third rotation hole is arranged on the assembly structure 31, a third rotation shaft is arranged on the third connection assembly 34, and the third rotation shaft extends into the third rotation hole.

Figure 15:
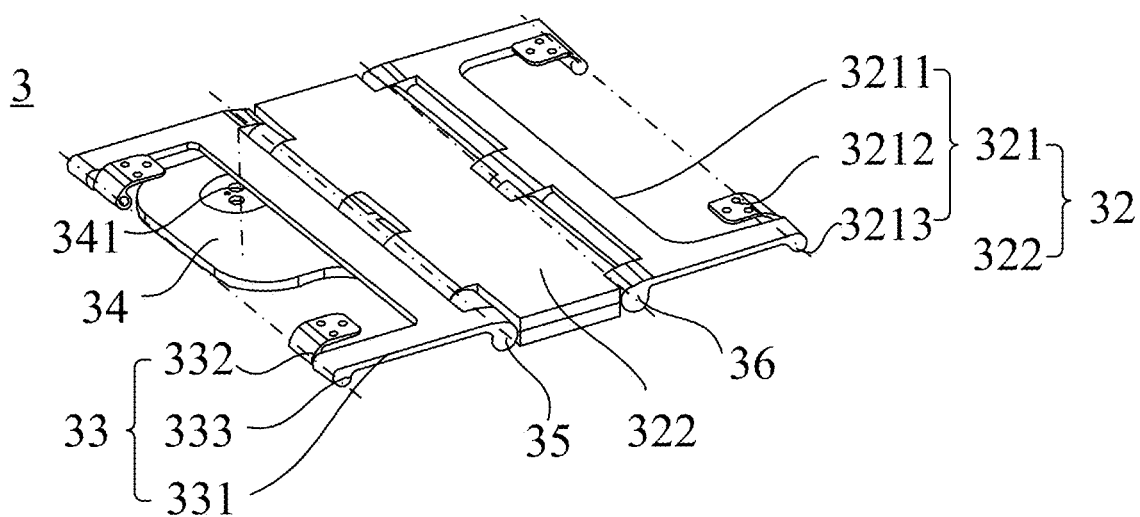
FIG. 15 illustrates a connection diagram among a first connection assembly, a second connection assembly and a third connection assembly consistent with various embodiments of the present disclosure.

Referring to FIG. 1 and FIG. 15, in some embodiments, the first connection assembly 32 includes a first connection component 321 and a second connection component 322 connected through a second rotating shaft structure 36. An end of the first connection component 321 away from the second connection component 322 is connected to the first input/output module 21 through at least a first connection portion 3212. The first input/output module 21 can have different postures relative to the first connection component 321 through the first connection portion 3212. An end of the second connection component 322 away from the first connection component 321 is connected to the second connection assembly 33 and the third connection assembly 34 through the first rotating shaft structure 35. After the first connection component 321 has the second posture relative to the second connection component 322, the second connection component 322 can perform the first type of motion relative to the second connection assembly 33 and the third connection assembly 34 through the first rotating shaft structure 35. By arranging the first connection component 321 and the second connection component 322, an interference between the first input/output module 21 and the host system 1 during motion can be avoided.

An end of the first connection component 321 away from the second connection component 322 is connected to the first input/output module 21 through at least the first connection portion 3212. The first input/output module 21 can have different postures relative to the first connection component 321 through the first connection portion 3212. Specifically, the first connection component 321 may include a first base 3211 and a first connection portion 3212. A fourth rotating shaft structure 3213 is arranged between the first base 3211 and the first connection portion 3212 so that the first input/output module 21 can have different postures relative to the first connection component 321 through the first connection portion 3212.

Specifically, the fourth rotating shaft structure 3213 includes a fourth rotating shaft arranged on the first base 3211 and a fourth rotating hole arranged on the first connection portion 3212, and the fourth rotation axis extends into the fourth rotation hole, or a fourth rotation hole arranged on the first base 3211 and a fourth rotation shaft arranged on the first connection portion 3212, and the fourth rotation shaft extends into the fourth rotation hole, so that the first input/output module 21 can have different postures relative to the first connector 321 through the first connection portion 3212 to adjust the pitch angle of the first input/output module 21.

For example, an end of the second connection component 322 away from the first connection component 321 is connected to the second connection assembly 33 and the third connection assembly 34 through the first rotating shaft structure 35. The second connection component 322 can be a rod-shaped structure, a plate-shaped structure, or a combined rod-shaped and plate-shaped structure, which is not limited herein. In one embodiment, the second connection component 322 is a combined rod-shaped and plate-shaped structure. On the one hand, a plate structure can enhance the support strength of a rod structure, and on the other hand, signal lines of the electronic device can also be concealed within a cavity of the plate structure to enhance a neatness of the electronic device.

Figure 11:
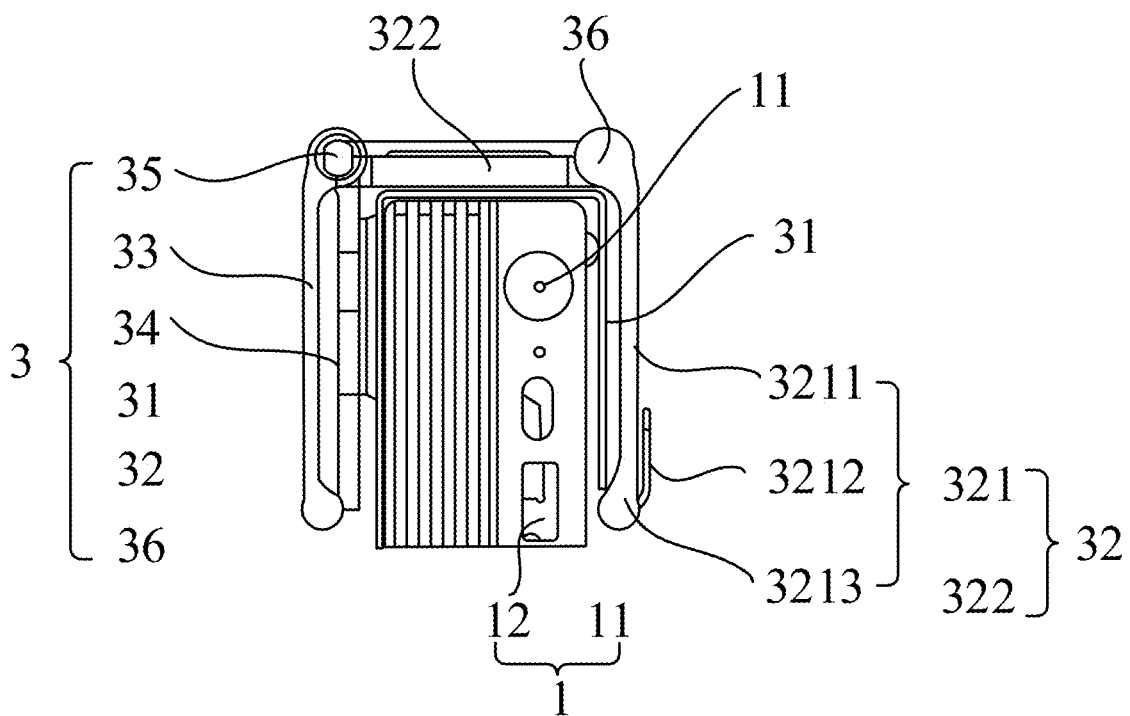
FIG. 11 illustrates a schematic diagram of a first connection component in a connection device before the first connection component is in a second posture relative to a second connection component consistent with various embodiments of the present disclosure.
Figure 12:
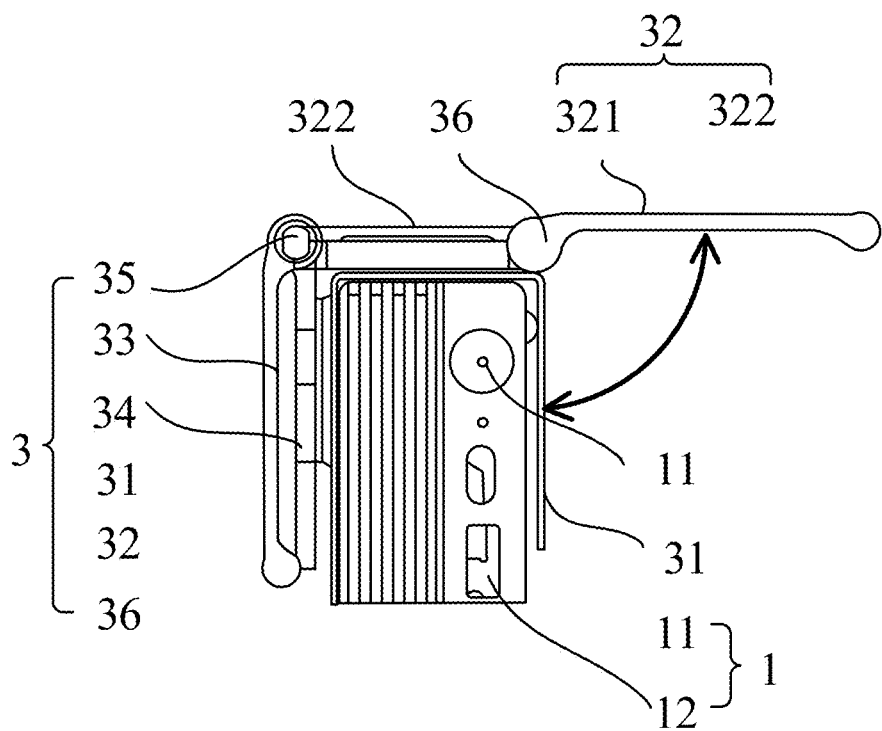
FIG. 12 illustrates a schematic diagram of a first connection component in a connection device when the first connection component is in a second posture relative to a second connection component consistent with various embodiments of the present disclosure.
Figure 13:
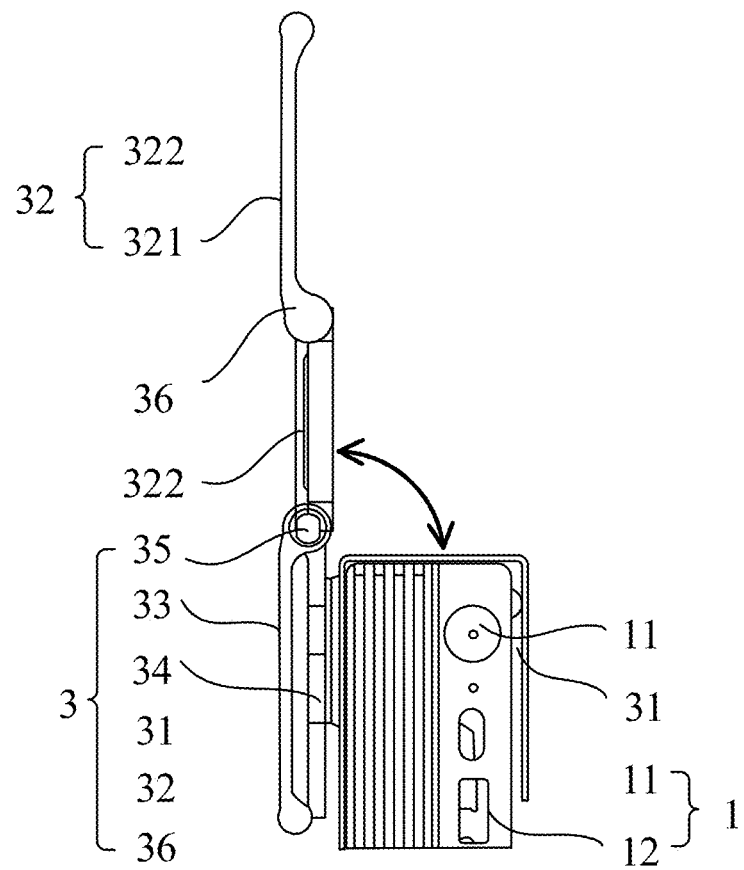
FIG. 13 illustrates a schematic diagram of a first connection component in a connection device after the first connection component is in a second posture relative to a second connection component consistent with various embodiments of the present disclosure.
Figure 14:
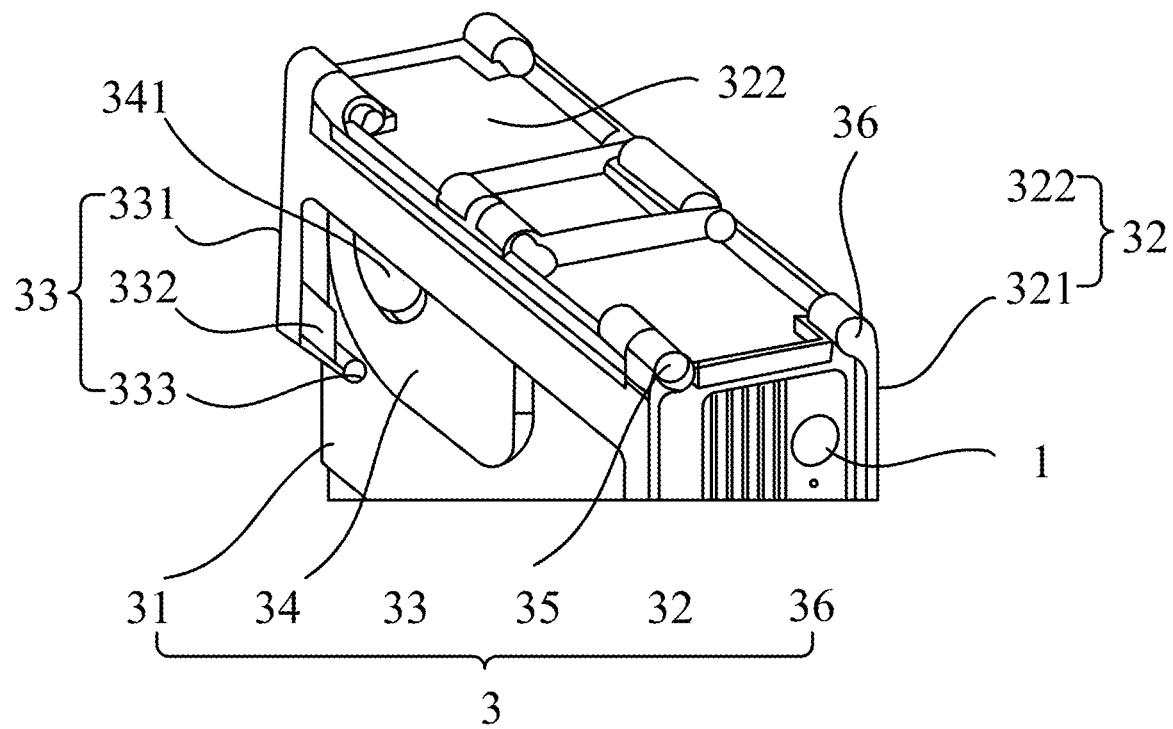
FIG. 14 illustrates a partial diagram of a connection device connected to a host system consistent with various embodiments of the present disclosure.

After the first connection component 321 has a second posture relative to the second connection component 322, the second posture is that the first connection component 321 is parallel to the second connection component 322. FIG. 11 illustrates a schematic diagram of the first connection component 321 before the first connection component 321 is in the second posture relative to the second connection component 322. FIG. 12 illustrates a schematic diagram of the first connection component 321 when the first connection component 321 is in the second posture relative to the second connection component 322. FIG. 13 illustrates a schematic diagram of the first connection component 321 after the first connection component 321 is in the second posture relative to the second connection component 322. The second connection component 322 can perform the first type of motion relative to the second connection assembly 33 and the third connection assembly 34 through the first rotating shaft structure 35, that is, the second connection component 322 rotates away from or approaches the second connection assembly 33 and the third connection assembly 34 through the second rotating shaft structure 36 so that the first input/output module 212 and the second input/output module 222 can achieve screen collage or split screen functionality.

The first connection assembly 32 includes a first connection component 321 and a second connection component 322 connected through the second rotating shaft structure 36. An end of the second connection component 322 away from the first connection component 321 is connected to the second connection assembly 33 and the third connection assembly 34 through the first rotating shaft structure 35, so that the first input/output module 21 on the first connection assembly 32 can adjust the pitch angle of the first input/output module 21 through the second rotating shaft structure 36. If the second rotating shaft structure 36 rotates toward a direction close to the second connection assembly 33, the pitch angle of the first input/output module 21 increases. If the second rotating shaft structure 36 rotates away from the second connection assembly 33, the pitch angle of the first input/output module 21 decreases. In addition, the second input/output module 22 on the second connection assembly 33 can adjust the pitch angle of the second input/output module 22 through the first rotating shaft structure 35. If the first rotating shaft structure 35 rotates toward a direction close to the first connection assembly 32, the pitch angle of the second input/output module 22 increases. If the first rotating shaft structure 35 rotates away from the first connection assembly 32, the pitch angle of the second input/output module 22 decreases.

The second connection assembly 33 is connected to the second input/output module 22 through a rotating shaft structure. The second connection assembly 33 includes a second base 331 and a second connection portion 332. A fifth rotating shaft structure 333 is arranged between the second base 331 and the second connection portion 332. Specifically, a fifth rotation axis can be arranged on the second base 331, a fifth rotation hole can be arranged on the second connection portion 332, and the fifth rotation axis extends into the fifth rotation hole. Or a fifth rotation hole is arranged on the second base 331, a fifth rotation shaft is arranged on the second connection portion 332, and the fifth rotation shaft extends into the fifth rotation hole.

A rotation axis of the first rotating shaft structure 35, a rotating axis of the second rotating shaft structure 36, a rotating axis of the fourth rotating shaft structure 3213 and a rotating axis of the fifth rotating shaft structure 333 can be either parallel or arranged at a certain angle, which is not limited herein. In one embodiment, the rotation axis of the first rotation shaft structure 35, the rotation axis of the second rotation shaft structure 36, the rotation axis of the fourth rotation shaft structure 3213 and the rotation axis of the fifth rotation shaft structure 333 are parallel.

Figure 16:
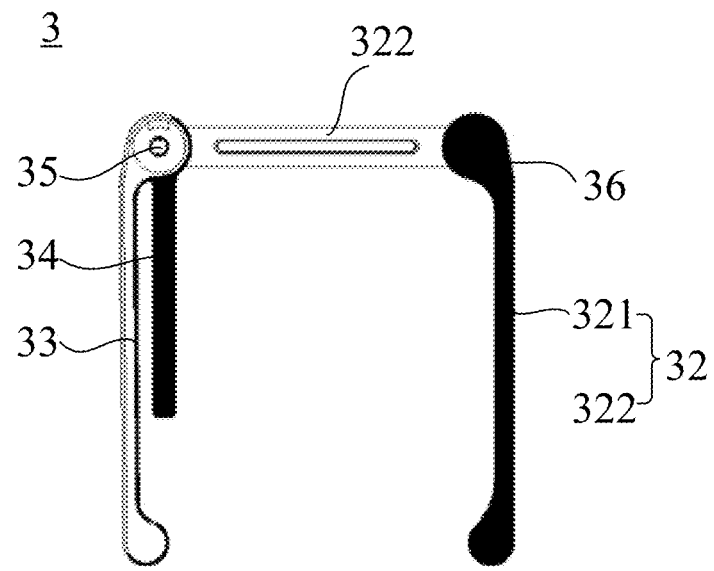
FIG. 16 illustrates a schematic diagram of a connection device in which a first connection assembly and a second connection assembly are on two sides of a host system, and the first connection assembly and the second connection assembly are parallel consistent with various embodiments of the present disclosure.
Figure 17:
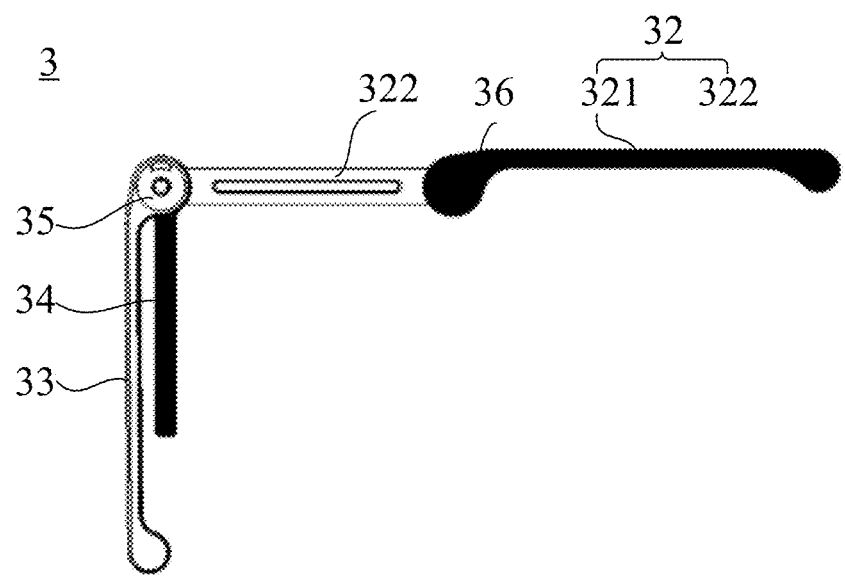
FIG. 17 illustrates a schematic diagram of a connection device in which a first connection assembly and a second connection assembly are on two sides of a host system, and the first connection assembly and the second connection assembly form a 90-degree angle consistent with various embodiments of the present disclosure.
Figure 18:
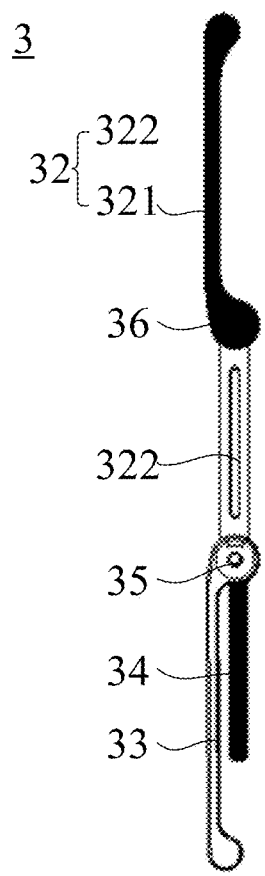
FIG. 18 illustrates a schematic diagram of a connection device in which a first connection assembly and a second connection assembly are on a side of the host system, and the first connection assembly and the second connection assembly are collinear in a vertical direction consistent with various embodiments of the present disclosure.

Referring to FIGS. 16-18, an end of the second connection component 322 away from the first connection component 321 is connected to the second connection assembly 33 and the third connection assembly 34 through the first rotating shaft structure 35, and an end of the second connection component 322 close to the first connection component 321 is connected through the second rotating shaft structure 36. Since the first connection component 321, the second connection component 322, the first connection assembly 32 and the second connection assembly 33 are all connected by rotating shafts, the first rotating shaft structure 35 or the second rotating shaft structure 36 cannot be placed in a locked state to adapt to different usage habits of users. Therefore, referring to FIG. 19, in one preferred embodiment, the first connection assembly 32 includes a locking component 3221 in the second connection component 322. During a motion of the second connection component 322 through the first rotating shaft structure 35 or the second rotating shaft structure 36, the locking component 3221 can perform a third type of motion, so that the first rotating shaft structure 35 or the second rotating shaft structure 36 is in a locked state respectively. Referring to FIGS. 20 and 21, when the first rotating shaft structure 35 is in a locked state, the first connection component 321 can rotate relative to the second connection component 322 through the second rotating shaft structure 36. Or referring to FIG. 22, when the second rotating shaft structure 36 is in the locked state, the second connection component 322 and the first connection component 321 can move together through the first rotating shaft structure 35.

Figure 21:
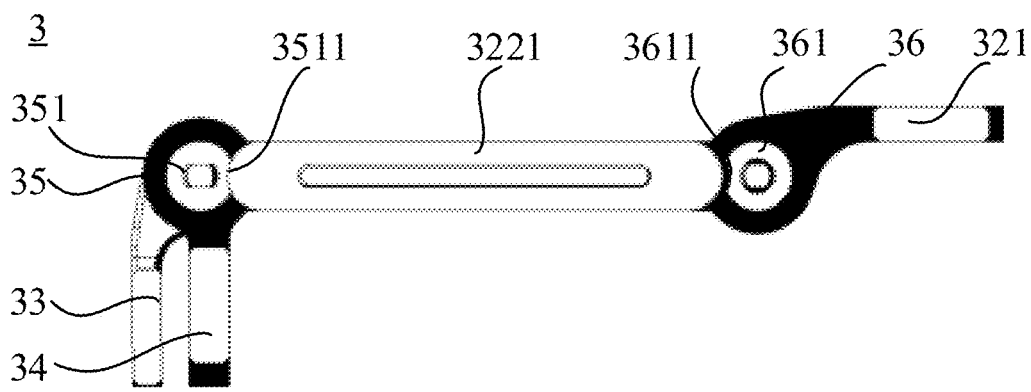
FIG. 21 illustrates a schematic diagram of a first rotating shaft structure in a locked state and a second rotating shaft structure not in a locked state.
Figure 22:
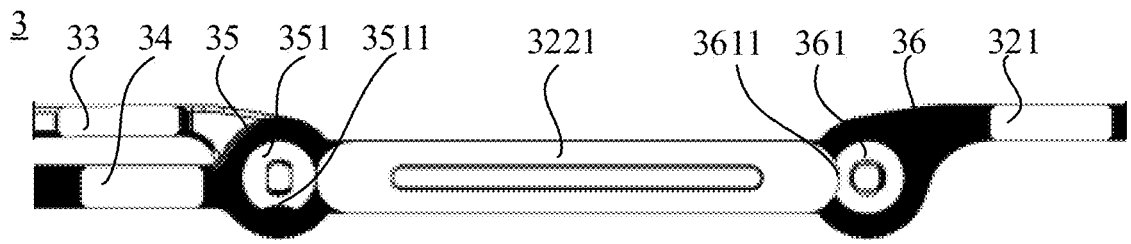
FIG. 22 illustrates a schematic diagram of a first rotating shaft structure in an unlocked state and a second rotating shaft structure in a locked state.

Specifically, the locking component 3221 arranged in the first connection component 321 can move in the second connection component 322. The first rotating shaft structure 35 and the second rotating shaft structure 36 are all arranged with a first locking portion 351 and a second locking portion 361 that cooperate with the locking component 3221. Referring to FIGS. 20 and 21, when the first rotating shaft structure 35 needs to be in a locked state, the locking component 3221 moves within the second connection component 322, moves to the first locking portion 351 of the first rotating shaft structure 35, and cooperates with the first locking portion 351, so that the first connection component 321 can rotate relative to the second connection component 322 through the second rotating shaft structure 36. Referring to FIGS. 21 and 22, when the second rotating shaft structure 36 needs to be in a locked state, the locking component 3221 moves in the second connection component 322, moves to the second locking portion 361 of the second rotating shaft structure 36, and cooperates with the second locking portion 361, so that the second connection component 322 and the first connection component 321 can move together through the first rotating shaft structure 35. The above solution is only a specific embodiment given in the present disclosure. The locking component 3221 can also move through other types of motion to make the first rotating shaft structure 35 or the second rotating shaft structure 36 respectively in a locked state.

One embodiment provides a specific implementation for locking the locking component 3221 with the first locking portion 351 and the second locking portion 361. The locking component 3221 is locked with the first locking portion 351 and the second locking portion 362 through grooves and protrusions. Specifically, two sides of the locking component 3221 close to the first locking portion 351 and the second locking part 361 are arc-shaped protrusions. The first locking portion 351 is arranged with a first groove 3511, and the second locking portion 361 is arranged with a second groove 3611. The locking component 3221 can move between the first locking portion 351 and the second locking portion 361 and is adapted to the first groove 3511 on the first locking part 351 or the second groove 3611 on the second locking part 361, so that the first rotating shaft structure 35 or the second rotating shaft structure 36 is in a locked state respectively. The locking component 3221 can also be locked with the first locking portion 351 and the second locking portion 361 in other ways, which is not limited herein.

Figure 19:
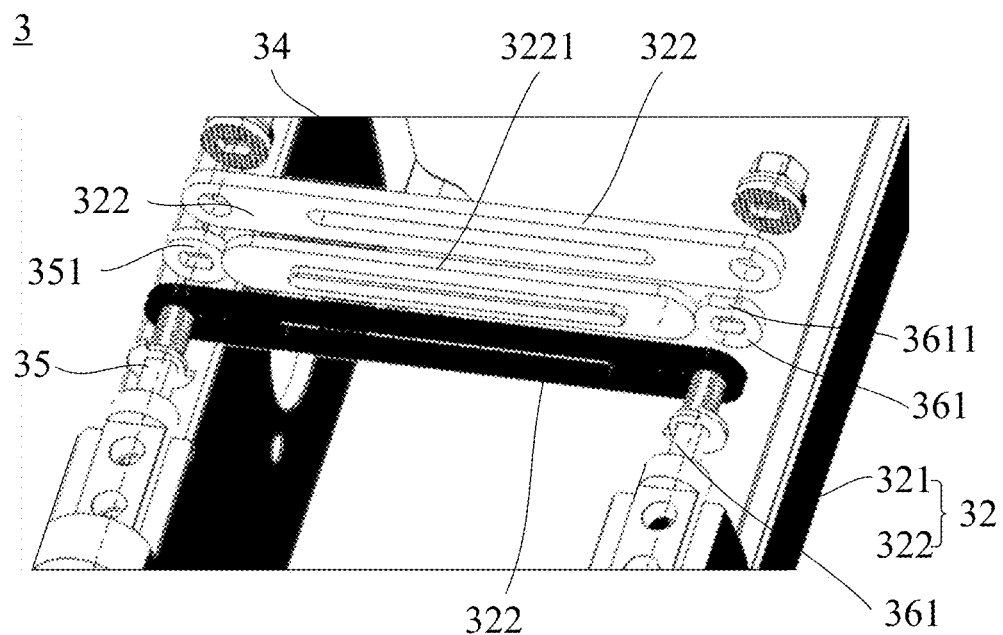
FIG. 19 illustrates a partial diagram of a first rotating shaft structure in a locked state and a second rotating shaft structure in an unlocked state.
Figure 20:
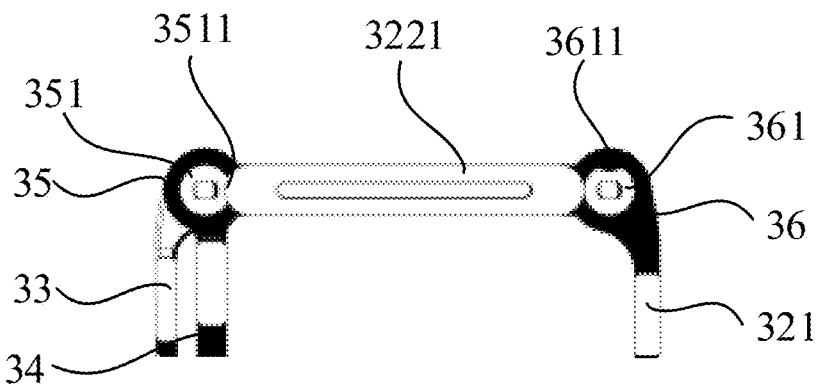
FIG. 20 illustrates a schematic diagram of a first rotating shaft structure in a locked state and a second rotating shaft structure in an unlocked state.

Specifically, referring to FIGS. 19 and 20, when the first rotating shaft structure 35 needs to be in a locked state, the locking component 3221 moves toward a side of the first locking portion 351 to match the first groove 3511 on the first locking portion 351 to lock the first rotating shaft structure 35. The second groove 3611 on the second locking portion 361 is not locked with the locking component 3221. Therefore, the first connection component 321 can rotate relative to the second connection component 322 through the second rotating shaft structure 36. Referring to FIGS. 21 and 22, when the first connection component 321 can rotate relative to the second connection component 322 through the second rotating shaft structure 36 and rotates until the locking component 3221 and the second groove 3611 are on a same straight line but does not extend into the second groove 3611, the locking component 3221 moves toward a side of the second locking portion 361 until the locking component 3221 matches the second groove 3611 to lock the second rotating shaft structure 36. A side of the locking component 3221 that matches the first groove 3511 moves out from the first groove 3511, and the first rotating shaft structure 35 is unlocked, so that the second connection component 322 and the first connection component 321 can move together through the first rotating shaft structure 35.

In some embodiments, after the first connection assembly 32 and the second connection assembly 33 move to a target relative-position there-between through the first rotating shaft structure 35, the first connection assembly 32 and the second connection assembly 33 may be in a parallel configuration. Referring to FIGS. 2-7, the first connection assembly 32 and the second connection assembly 33 may also be in an included angle shape. Referring to FIGS. 1, 8 and 9, the first input/output module 212 and the second input/output module 222 can cooperate to realize the input and/or output functions of the electronic device. For example, a split screen of the F2F input/output modules 2 or a spliced screen of the input/output modules 2 can be formed to realize an array or expansion of the input/output modules 2.

In some other embodiments, the first connection assembly 32 and/or the second connection assembly 33 can also perform a fourth type of motion relative to the assembly structure 31, which is different from the first type or the second type. A shape of the assembly structure 31 can be changed to adapt to different sizes or types of host systems 1.

Since types or sizes of host systems 1 are different, outer contours of the host systems 1 are also different accordingly. To adapt to the host systems 1 of different sizes or types, the shape of the assembly structure 31 can be adjusted; or the first connection assembly 32 and/or the second connection assembly 33 can be added to perform a fourth type of motion relative to the assembly structure 31; or the shape of the assembly structure 31 can be adjusted, and the first connection assembly 32 and/or the second connection assembly 33 can be added to perform a fourth type of motion relative to the assembly structure 31, which is not limited herein. Other methods can also be applied to adapt to the host systems 1 of different sizes or types.

The first connection assembly 32 and/or the second connection assembly 33 can also perform the fourth type of motion relative to the assembly structure 31. The first connection assembly 32 and/or the second connection assembly 33 can expand and contract along a length or width direction of the assembly structure 31. That is, the fourth type of motion may be linear telescopic motion, which may adapt to the host systems 1 of different sizes or types.

In addition, the shape of the assembly structure 31 can change. For example, when the assembly structure 31 is a U-shaped card holder, a sliding mechanism can be arranged between each part of the U-shaped card holder, and adjacent parts between the U-shaped card holders can slide to adjust a size of the U-shaped card holder to adapt to the host systems 1 of different sizes or types.

As disclosed, the electric device provided by the present disclosure at least realizes the following beneficial effects.

Since the electronic device includes at least two input/output modules that can realize input and/or output functions thereof, which is convenient for a group of users to use the electronic device simultaneously. In addition, the electronic device also includes a connection device, which is configured to connect the host system and the at least two input/output modules to enable the at least two input/output modules to perform a same type and/or different types of motion relative to the host system. Therefore, postures of the at least two input/output modules can be adjusted according to a user's usage habits and needs to facilitate the user's use. The at least two input/output modules have a same position or different positions relative to the host system, so that forms of the electronic device are diverse and a user's interest in using the electronic device is enhanced. Compared to electronic devices in the related art, the electronic device provided by the embodiments of the present disclosure can be used by a group of users at a same time and can adjust postures of the input/output modules according to users' different usage habits and is also easy to carry, thereby offering diverse forms of the electronic device.

The above are only preferred embodiments of the present disclosure and are not used to limit the scope of the present invention. Any modifications, equivalent substitutions and improvements made within the spirit and principles of the present disclosure shall be included in the protection scope of the present disclosure.

What is claimed is:

1. An electronic device, comprising:
    a host system;
    at least two input/output modules, configured to realize input and/or output functions of the electronic device; and
    a connection device, configured to connect the host system and the at least two input/output modules to enable the at least two input/output modules to perform a same type and/or different types of motion relative to the host system, so that the electronic device has different device forms;
    wherein:
        the at least two input/output modules have a same posture or different postures relative to the host system when the electronic device is in the different device forms;
        the connection device includes:
            an assembly structure configured to fix the connection device onto the host system;
            a first connection assembly movably connected to the assembly structure and a first input/output module of the at least two input/output modules, and configured to perform a first type of motion relative to the assembly structure, so that the first input/output module has different postures relative to the host system; and
            a second connection assembly movably connected to the assembly structure and a second input/output module of the at least two input/output modules, and configured to perform the first type of motion relative to the assembly structure, so that the second input/output module has different postures relative to the host system; and
        the first connection assembly and the second connection assembly are configured to perform a second type of motion relative to the assembly structure when the first connection assembly and the second connection assembly are on a same side of the assembly structure, to cause the first input/output module and the second input/output module to be rotated synchronously with an unchanged relative position between the first connection assembly and the second connection assembly and to have different postures relative to the host system.

2. The electronic device according to claim 1, wherein the connection device further includes a third connection assembly movably connected to the assembly structure, the third connection assembly is connected to the first connection assembly and the second connection assembly through a first rotating shaft structure, and the first connection assembly and the second connection assembly are configured to perform the second type of motion relative to the assembly structure through the third connection assembly.

3. The electronic device according to claim 2, wherein:
    the first connection assembly includes a first connection component and a second connection component that are connected through a second rotating shaft structure;
    an end of the first connection component away from the second connection component is connected to the first input/output module through at least a first connection portion, and the first input/output module has different postures relative to the first connection component through the first connection portion;
    an end of the second connection component away from the first connection component is connected to the second connection assembly and the third connection assembly through the first rotating shaft structure; and
    after the first connection component has a second posture relative to the second connection component, the second connection component is configured to perform the first type of motion relative to the second connection component and the third connection component through the first rotating shaft structure.

4. The electronic device according to claim 3, wherein:
    the first connection assembly further includes a locking component arranged in the second connection component, during a motion of the second connection component through the first rotating shaft structure or the second rotating shaft structure, the locking component is configured to perform a third type of motion, so that the first rotating shaft structure or the second rotating shaft structure is in a locked state:
    when the first rotating shaft structure is in the locked state, the first connection component is configured to rotate relative to the second connection component through the second rotating shaft structure; and
    when the second rotating shaft structure is in the locked state, the second connection component and the first connection component are configured to move together through the first rotating shaft structure.

5. The electronic device according to claim 2, wherein after the first connection component and the second connection component move to a target relative-position therebetween through the first rotating shaft structure, the first input/output module and the second input/output module are further configured to cooperate to realize the input and/or output functions of the electronic device.

6. The electronic device according to claim 1, wherein:
    the first connection assembly and/or the second connection assembly are further configured to perform a fourth type of motion relative to the assembly structure, the fourth type of motion is different from the first type of motion or the second type of motion; and/or
    a shape of the assembly structure is changeable to adapt to host systems of different sizes or types.

7. The electronic device according to claim 1, further comprising:
    a substrate, for placing the host system on a bearing surface, and the substrate being arranged with an accommodation space and/or I/O interfaces matching the host system.

8. The electronic device according to claim 1, further comprising:
    a driving structure, connected to the connection device to generate driving forces to drive the at least two input/output modules to perform a same type and/or different types of motion relative to the host system; and
    a controller, signally connected to the driving structure, and configured to control the driving structure to generate the driving forces according to control instructions.

9. The electronic device according to claim 8, further comprising:
    a detection component, configured to detect environmental information of an environment in which the electronic device is located, the electronic device being configured to generate the control instructions based on the environmental information, and the detection component being included in at least one of the at least two input/output modules.

10. The electronic device according to claim 8, further comprising:
a detection component, configured to detect environmental information of an environment in which the electronic device is located, the electronic device being configured to generate the control instructions based on the environmental information, and the detection component being not included in the at least two input/output modules.

11. The electronic device according to claim 1, wherein the host system comprises:
a switch key, capable of controlling opening and closing of the electronic device; and
a plurality of plug-in interfaces, for ensuring a normal functioning of the electronic device and/or to facilitate external plug-ins by users.

12. The electronic device according to claim 1, wherein:
the at least two input/output modules include two display modules configured to split a screen.

13. The electronic device according to claim 12, wherein each of the two display modules is configured to adopt an organic light-emitting diode plane.

14. The electronic device according to claim 1, wherein:
the at least two input/output modules include two display modules configured to be spliced to expand different usage scenarios.

15. The electronic device according to claim 14, wherein each of the two display modules is configured to adopt an organic light-emitting diode plane.

16. An electronic device, comprising:
a host system;
at least two input/output modules, configured to realize input and/or output functions of the electronic device; and
a connection device, configured to connect the host system and the at least two input/output modules to enable the at least two input/output modules to perform a same type and/or different types of motion relative to the host system, so that the electronic device has different device forms;
wherein:
the at least two input/output modules have a same posture or different postures relative to the host system when the electronic device is in the different device forms; and
the connection device includes:
an assembly structure configured to fix the connection device onto the host system;
a first connection assembly movably connected to the assembly structure and a first input/output module of the at least two input/output modules, and configured to perform a first type of motion relative to the assembly structure, so that the first input/output module has different postures relative to the host system;
a second connection assembly movably connected to the assembly structure and a second input/output module of the at least two input/output modules, and configured to perform the first type of motion relative to the assembly structure, so that the second input/output module has different postures relative to the host system; and
a third connection assembly movably connected to the assembly structure, and connected to the first connection assembly and the second connection assembly through a first rotating shaft structure, wherein the first connection assembly and the second connection assembly are further configured to perform a second type of motion relative to the assembly structure through the third connection assembly when the first connection assembly has a first posture relative to the assembly structure, so that the first input/output module and the second input/output module have different postures relative to the host system.

* * * * *